3 Sheets—Sheet 1.

H. S. RICHARDSON.
MACHINE FOR POUNCING FELT CLOTH.

No. 177,662. Patented May 23, 1876.

Witnesses:
H. Chadbourn.
F. Allen.

Inventor:
Henry S. Richardson
by his atty.
Alban Andrèn

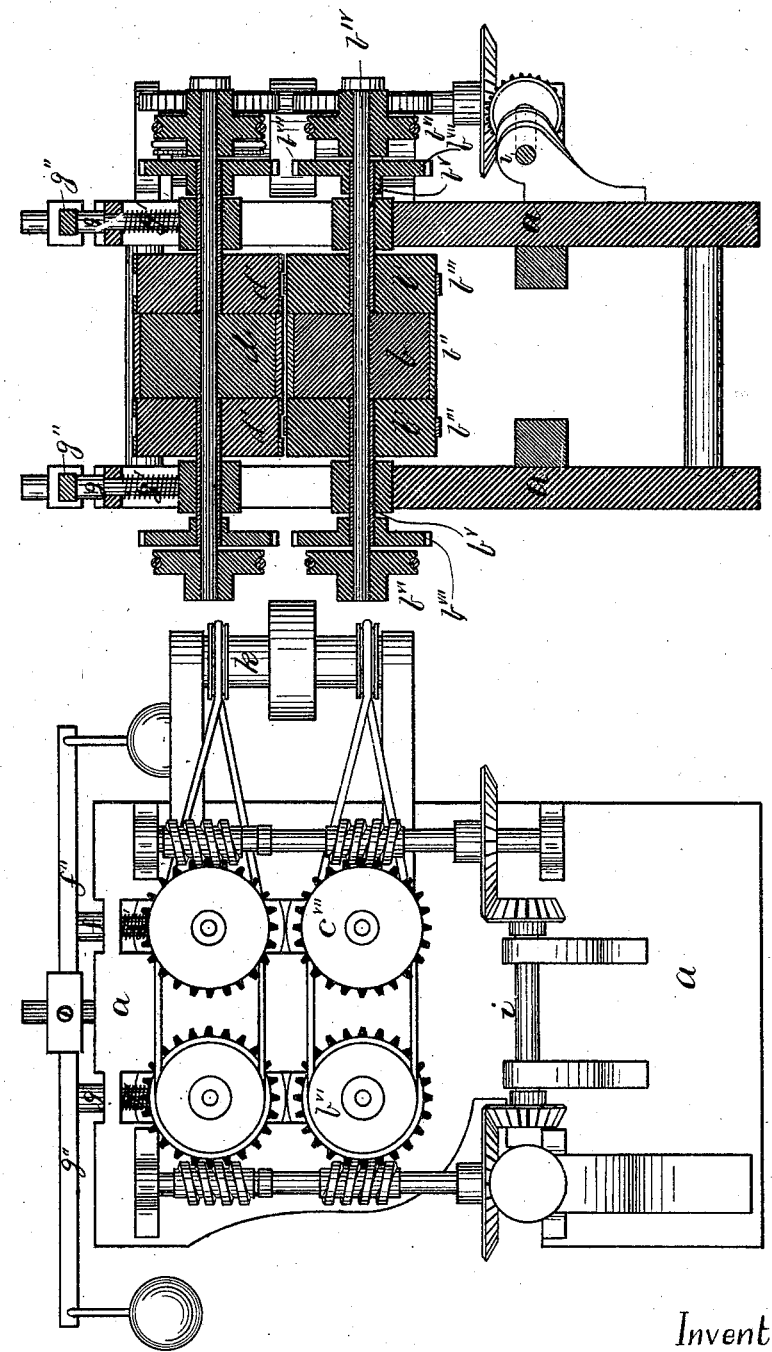

3 Sheets—Sheet 3.

H. S. RICHARDSON.
MACHINE FOR POUNCING FELT CLOTH.

No. 177,662. Patented May 23, 1876.

Witnesses:
H. Chadbourn.
F. Allen.

Inventor:
Henry S. Richardson
by his atty.
Alban Andrén

N. PETERS, PHOTO-LITHOGRAPHER, WASHINGTON, D.C.

UNITED STATES PATENT OFFICE.

HENRY S. RICHARDSON, OF WINCHESTER, MASSACHUSETTS.

IMPROVEMENT IN MACHINES FOR POUNCING FELT CLOTH.

Specification forming part of Letters Patent No. 177,662, dated May 23, 1876; application filed January 28, 1876.

*To all whom it may concern:*

Be it known that I, HENRY S. RICHARDSON, of Winchester, in the county of Middlesex and State of Massachusetts, have invented certain new and useful Improvements in Felt Pouncing and Surfacing Machines; and I do hereby declare that the following is a full, clear, and exact description thereof, which will enable others skilled in the art to which it pertains to make and use the same, reference being had to the accompanying drawing, and to the letters of reference marked thereon, which form a part of this specification.

My invention relates to improvements in felt surfacing and pouncing machines; and consists in the combination of feed-rollers, having rubber or suitable flexible facings, with gritty surfacing speed-rollers, located on one and the same shaft. I employ two pairs of rollers, the first pair having its flexible feed-surface located in the middle of the rollers, and the gritty surfacing parts located on each side of the feed-roller. The second pair has the gritty surfacing part located in the middle of the rollers, and the feed-surfaces located on each side of the gritty speed-roller, or vice versa.

It will be observed that I employ on each shaft both feed-rolls and surfacing-rolls—that is, on one shaft a pair of surfacing-rolls and one feed-roll, with the same kind of rolls above on a second shaft. The next pair of shafts have each a pair of feed-rolls on each side of the surfacing-roll that is located between them. Consequently I employ a series of rolls, each roll having both feed and surfacing rolls, on one and the same shaft.

In combination with the gritty speed-rollers and the feed-rollers, I employ an adjustable block, with levers and weights in each end of the upper rollers, for the purpose of adjusting the upper rollers in relation to the lower ones, so as to make the machine adapted for felt of different thicknesses as well as for tapering felt.

Figure 2:
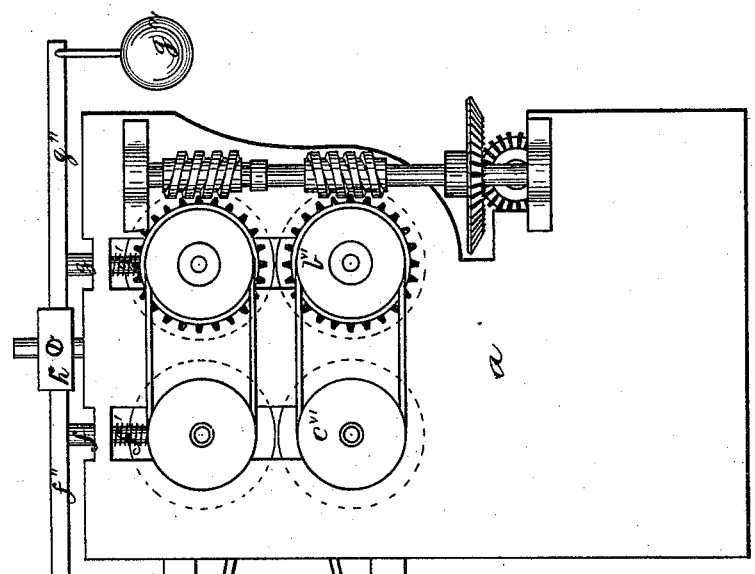
Figure 1:
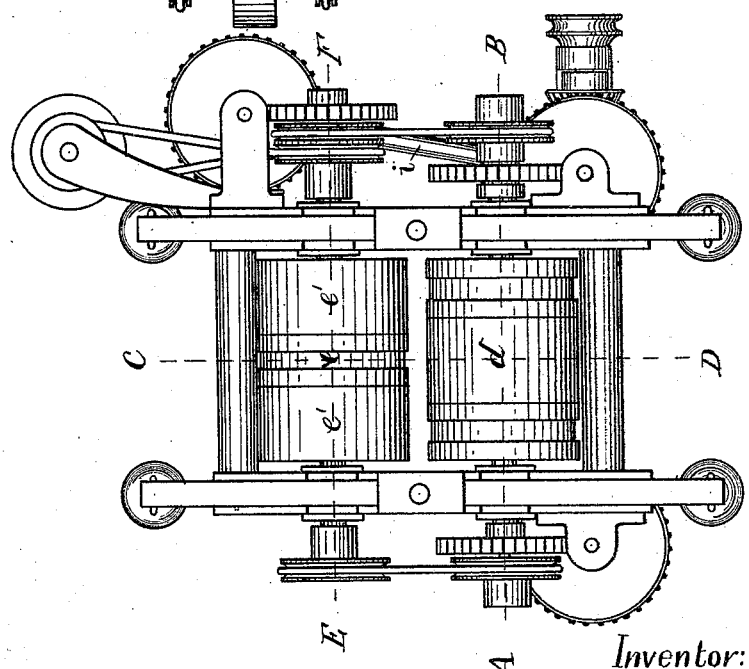
Figure 6:
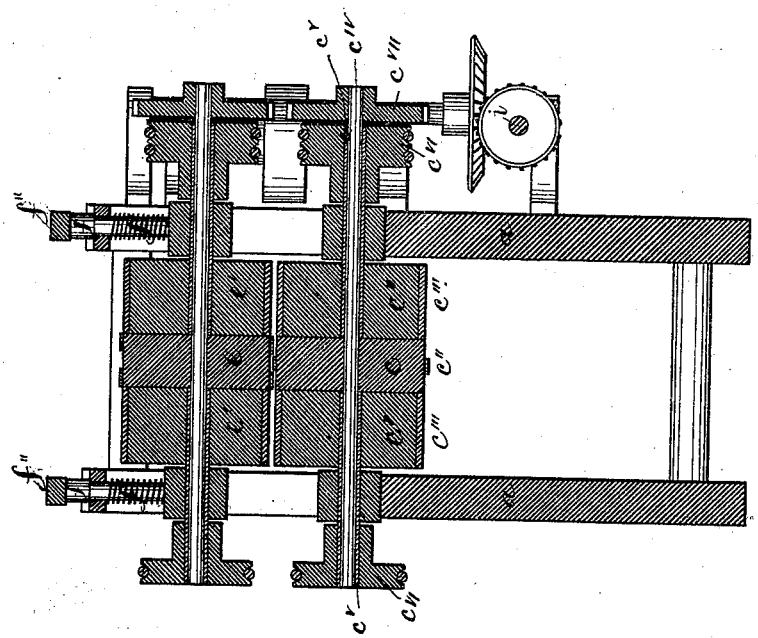
Figure 5:
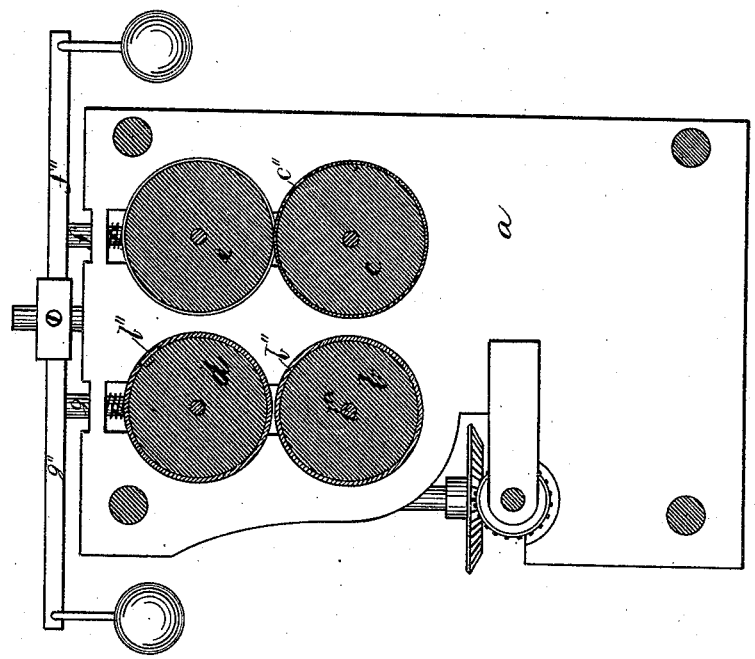

On the accompanying drawings, Figure 1 represents a ground plan of my invention. Fig. 2 represents a side view, seen from A E on Fig. 1. Fig. 3 represents a side view, seen from B F on Fig. 1. Fig. 4 represents a cross-section on the line A B, seen in Fig. 1. Fig. 5 represents a cross-section on the line C D, seen in Fig. 1; and Fig. 6 represents a cross-section on the line E F, shown in Fig. 1.

Similar letters refer to similar parts wherever they occur on the different parts of the drawings.

$a\ a$ represent the frame of the machine, in which is located, in stationary bearings, the lower rollers $b\ c$, as shown in Fig. 5. Each of the lower rollers $b\ c$ is composed of three parts—viz., the roller $b$ is composed of one speed-roller, $b$, covered with a gritty surface, $b''$, and a pair of feed-rollers, $b'\ b'$, provided with flexible feed-surfaces $b'''\ b'''$. (Shown in Fig. 4.) The roller $c$ is also composed of three parts—viz., one feed-roller, $c$, covered with a flexible feed-surface, $c''$, and a pair of speed-rollers, $c'\ c'$, covered with the gritty surfaces $c'''\ c'''$, as shown in Fig. 6. The gritty speed-roller $b$ is attached to the speed-shaft $b^{iv}$, and the feed-rollers $b'\ b'$ are secured to the tubular shafts $b^v\ b^v$, surrounding the speed-shaft $b^{iv}$, by which I am able to impart an independent motion to the rollers $b\ b'\ b'$ of each other—that is, a fast motion to the speed-roller $b$, and a slow motion to the feed-rollers $b'\ b'$. Motion is imparted to the speed-shaft $b^{iv}$ by means of the pulleys $b^{vi}\ b^{vi}$, or equivalent device. The tubular shafts $b^v\ b^v$ are set in motion by power applied to the gear-wheels $b^{vii}\ b^{vii}$, or equivalent device.

The object of this arrangement is to have the feed-rollers feed the material slowly forward during the pouncing or surfacing operation of the felt by the gritty speed-rollers.

In a similar manner the feed-roller $c$ is attached to the slow shaft $c^{iv}$, operated by the gear-wheel $c^{vii}$, and the speed-rollers $c'\ c'$ secured independently to the tubular shafts $c^v\ c^v$, that are set in motion by the pulleys $c^{vi}\ c^{vi}$, or equivalent device.

Above the rollers $b\ c$ are located the rollers $d\ e$, in bearings that are adjustable up and down, so as to allow a thicker or thinner or tapering felt to pass between each pair of rollers. The rollers $d\ e$ are automatically adjustable by means of the springs $f'\ g'$, rods $f\ g$, adjustable blocks $h\ h$, levers $f''\ g''$, and the weights $f'''\ g'''$, as fully shown in the drawings.

The roller $d$ is constructed and operated in a similar manner to that described in regard to the roller $b$. The same is true as regards the rollers $c$ and $e$.

The feed-rollers are geared and connected together and driven from the driving-shaft $i$ by means of bevel and worm gears or suitable connecting mechanism, as fully shown in the drawings.

The speed-rollers are connected and driven from the driving-shaft $k$ and suitable pulleys and cords, or similar device, as fully represented in the drawings.

What I wish to secure by Letters Patent, and claim, is—

1. A pouncing or surfacing machine, consisting of rollers having flexible faces for the feed of the material, and gritty surfacing-rolls for the pouncing of the material, each roll in the series being composed of both feed and surfacing rolls, substantially as and for the purpose described.

2. In combination with the feed and surfacing rollers, as described, the adjustable blocks $h\ h$, levers $f''\ g''$, weights $f'''\ g'''$, and rods $f\ g$, as and for the purpose set forth and described.

In testimony that I claim the foregoing as my own invention I have affixed my signature in presence of two witnesses.

HENRY S. RICHARDSON.

Witnesses:
ALBAN ANDRÉN,
HENRY CHADBOURN.